C. J. CRAIG.
RESILIENT WHEEL.
APPLICATION FILED JAN. 7, 1911.
1,041,244.
Patented Oct. 15, 1912.
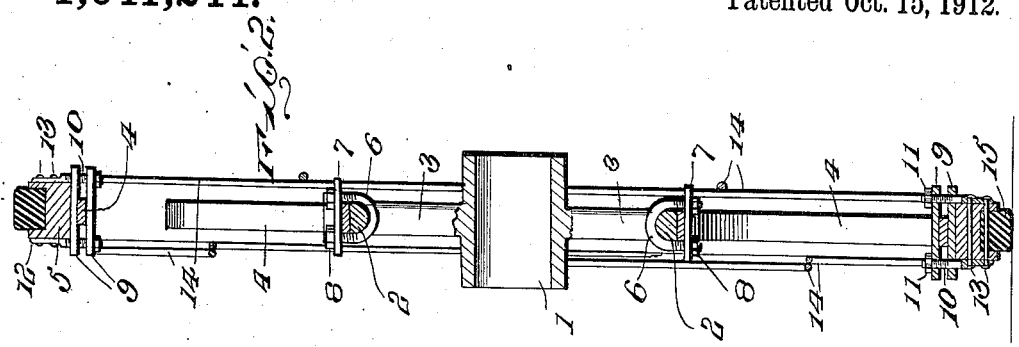
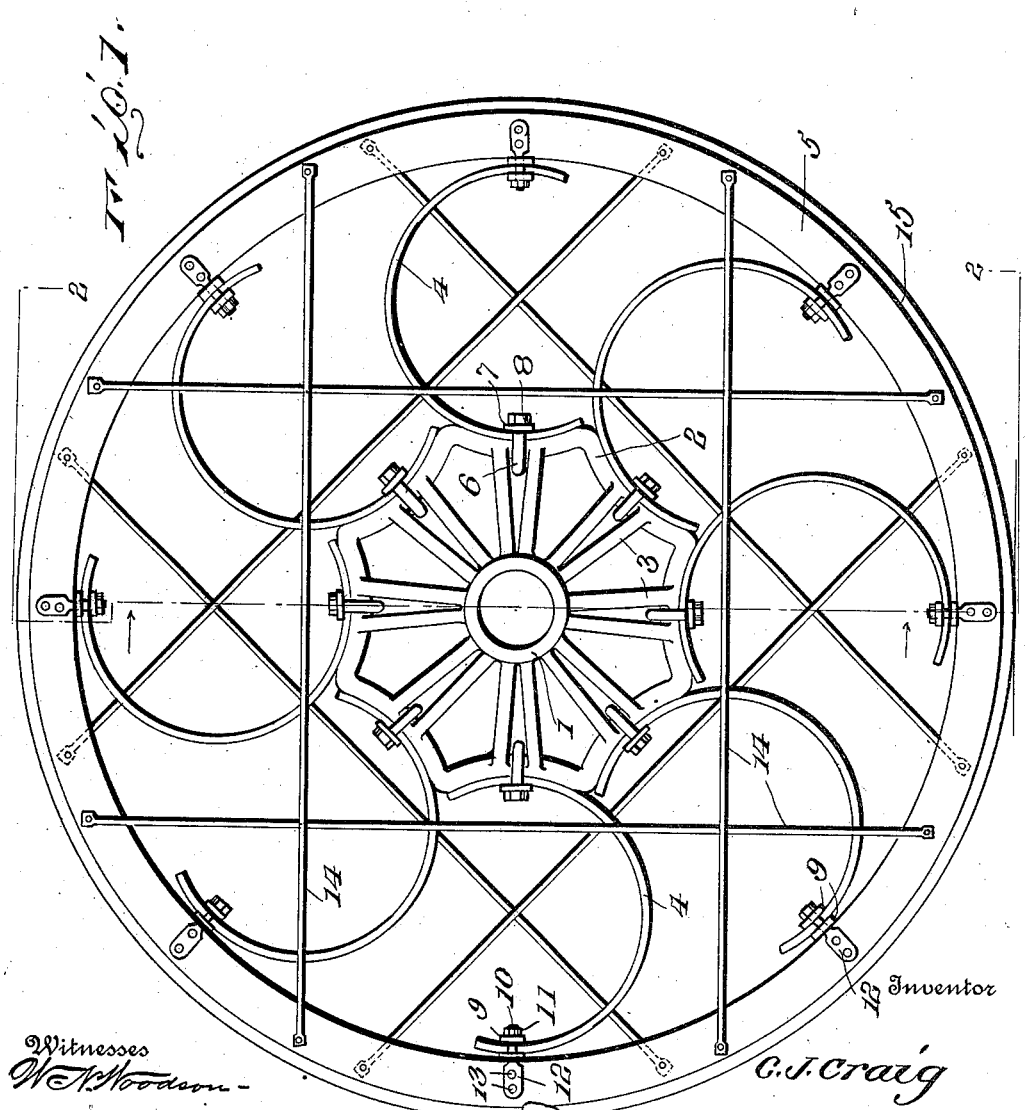
Witnesses
W. N. Woodson
Juana M. Fallin
Inventor
C. J. Craig
By
H. A. Nstacy, Attorneys.

UNITED STATES PATENT OFFICE.

CHARLEY J. CRAIG, OF LATHROP, MISSOURI.

RESILIENT WHEEL.

1,041,244.  Specification of Letters Patent.  Patented Oct. 15, 1912.

Application filed January 7, 1911. Serial No. 601,337.

*To all whom it may concern:*

Be it known that I, CHARLEY J. CRAIG, a citizen of the United States, residing at Lathrop, in the county of Clinton and State of Missouri, have invented certain new and useful Improvements in Resilient Wheels, of which the following is a specification.

The present invention comprehends certain new and useful improvements in vehicle wheels, and the object of the invention is to provide an improved resilient wheel including inner and outer rims which are connected together by means of an interposed series of curved springs, whereby to cause the wheel to absorb the shocks incident to travel, and to obviate the use of the ordinary pneumatic tire which has been found so objectionable in practice.

Another object of the invention is to provide improved means for detachably securing the ends of each spring to the inner and outer rims, the spring being thus adapted to be readily removed and replaced by a new part so as to enable the wheel to be conveniently repaired.

A further object of the invention is to provide a plurality of braces on each side of the outer rim, and to arrange these braces so that they extend across the intermediate portions of the springs to prevent the springs from being accidentally displaced laterally from the plane of the wheel.

A still further object of the invention is to provide a resilient wheel which is thoroughly reliable and efficient in operation, which is simple, durable and strong in construction, and which is particularly adapted for use on automobiles, although not limited to any such use, but susceptible of general application.

I attain these and other objects by the structure illustrated in the accompanying drawing, in which:

Figure 1 is a side elevation of my improved wheel; and, Fig. 2 is a section on the line 2—2 of Fig. 1.

Corresponding and like parts are referred to in the following description and indicated in all the views of the drawing by the same reference characters.

My improved wheel includes a metallic bearing sleeve 1 which is designed to be slipped on the axle spindle and to rotate freely thereon. Surrounding the sleeve in concentric relation thereto, is a frame or inner ring 2 that is preferably in the form of a regular polygon. The inner ring is supported from the sleeve through the medium of a plurality of arms 3 radiating from the sleeve, there being a pair of arms provided for each side of the polygon. The arms of each pair join the side of the polygon at points on opposite sides of and in close proximity to the middle of said side, for a purpose to be hereinafter disclosed. The bearing sleeve, arms and inner ring or frame, constitute the hub of the wheel and in the present instance are cast or otherwise formed of integral structure, whereby to simplify the construction of the wheel by reducing the number of parts which must be assembled.

The sides of the polygonal inner ring have their outer faces curved longitudinally to provide concave seats for the inner ends of curved springs 4 that are interposed between the inner ring and the outer rim 5 of the wheel. The springs are arranged in an annular series and may be of any suitable number according to the weight of the vehicle to which the wheel is to be applied. However, the number of springs and the number of sides of the inner ring must be the same. Each spring is curved in the plane of the wheel and is substantially C-shape in form and has its ends bearing against the inner ring and outer rim respectively. All of the springs of the series face in the same circular direction, which is the opposite direction to that in which the wheel rotates during the forward movement of the vehicle.

The inner end of each spring is fastened in place by a clip consisting of a U-bolt 6 which embraces the middle portion of the adjacent side of the inner ring with its extremities projecting outwardly therebeyond on opposite sides of the spring. A gland 7 is slipped on the projecting ends of the U-bolt and bears against the end of the spring to retain the same in its concave seat. Nuts 8 work on the U-bolt to hold the gland in adjusted position. Attention is now directed to the fact that the clip is positioned between the corresponding pair of arms 3, and that these arms abut against opposite sides of the clip to confine the same against movement in the direction of the length of the side of the inner ring.

The possibility of the clip slipping on the inner ring out of engagement with the end of the spring, is thus effectually precluded. The outer end of each spring is interposed between two glands 9 that extend transversely at the inner surface of the rim 5. The glands are mounted on a pair of bolts 10 which project radially inwardly from the outer rim on opposite sides of the spring. The glands are clamped on the spring through the medium of nuts 11 working on the inner extremities of the bolts. The bolts have flattened heads 12 that lie against opposite sides of the rim and are secured thereto by one or more rivets or like fastening devices 13, the fastening devices being inserted through both of the flattened heads and through the interposed rim. By means of the connections above described, the springs are fastened at both ends in a thoroughly reliable and efficient manner. It will be seen that any one of the springs may be conveniently detached when occasion requires by merely loosening the nuts 8 and 11 at the ends of the springs. A new spring may, therefore, be quickly substituted for a damaged spring to repair the wheel, and such repairs may be made with little trouble while on the road. As the springs are all substantial duplicates, an extra spring may be substituted for any one of the series.

It has been found desirable to provide means for preventing the middle portions of the springs from possibly becoming displaced laterally from the plane of the wheel. To this end, a set of braces or chord members 14 are secured to each side of the outer rim 5. Each brace is shorter than the diameter of the outer rim and extends across the intermediate portions of a plurality of springs, as shown. There are a sufficient number of braces in each set so that all of the springs of the series are confined against lateral movement. The braces also serve the additional function of reinforcing the outer rim 5, which is preferably of wood, so as to preserve its annular contour. The outer rim may be equipped with a tire 15 of steel, solid rubber, or any other suitable material.

From the foregoing description in connection with the accompanying drawing, it will be apparent that the series of springs will yieldably support the outer rim from the hub so as to cause the wheel to absorb the shocks incident to travel over rough roads or the like. Of course, the braces 14 in no wise interfere with the free action of the springs in the plane of the wheel, and hence the springs will yield readily to any stress or strain, and as soon as relieved of pressure, will return to their normal positions. This causes the wheel to have a maximum resiliency of structure and effectually obviates the necessity of equipping the wheel with a pneumatic tire.

What I claim is:—

A wheel comprising a hub made up of a central cylindrical portion and a continuous ring portion having inwardly bowed arcuate sections and arms connecting the cylindrical portion with the ring and arranged in pairs each pair joining with one of the sections of the said ring and the members of the pairs being spaced from each other at their outer ends, a rim surrounding the ring, arcuate springs secured at their outer portions to the rim and at their inner portions bearing in the arcuate sections of the said ring, and clamping bolts surrounding the inner portions of the springs and the arcuate sections of the ring and lying between the members of the pairs of arms and holding the inner ends of the springs in position in the arcuate sections of the ring.

In testimony whereof, I affix my signature in presence of two witnesses.

CHARLEY J. CRAIG. [L. S.]

Witnesses:
M. L. CRAIG,
JOE T. DOHERTY.

---

Copies of this patent may be obtained for five cents each, by addressing the "Commissioner of Patents, Washington, D. C."